(12) United States Patent
Duan et al.

(10) Patent No.: US 6,965,229 B2
(45) Date of Patent: Nov. 15, 2005

(54) METHOD OF DETECTING POLARITY REVERSAL IN A MAGNETORESISTIVE SENSOR

(75) Inventors: Shanlin Duan, Fremont, CA (US); Yan Liu, Cupertino, CA (US); Li Tang, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 175 days.

(21) Appl. No.: 10/632,768

(22) Filed: Aug. 1, 2003

(65) Prior Publication Data

US 2005/0024046 A1 Feb. 3, 2005

(51) Int. Cl.⁷ .................... G11B 27/36; G01R 33/12
(52) U.S. Cl. .................................... 324/210; 360/31
(58) Field of Search .............................. 324/210, 212; 360/31; 365/201

(56) References Cited

U.S. PATENT DOCUMENTS

| 5,640,089 | A | 6/1997 | Horikawa et al. | 324/212 |
|---|---|---|---|---|
| 5,998,993 | A | 12/1999 | Inage et al. | 324/210 |
| 6,081,114 | A | 6/2000 | Shimazawa et al. | 324/210 |
| 6,249,392 | B1 | 6/2001 | Sacks et al. | 360/31 |
| 6,295,175 | B1 | 9/2001 | Tomita et al. | 360/31 |
| 6,373,647 | B1 | 4/2002 | Baker | 360/25 |
| 6,400,519 | B2 | 6/2002 | Mukoyama | 360/31 |
| 6,489,762 | B2 | 12/2002 | Wang et al. | 324/210 |
| 6,519,108 | B2 | 2/2003 | Au et al. | 360/77.04 |
| 2002/0063984 | A1 | 5/2002 | McClellan | 360/46 |
| 2002/0113587 | A1 | 8/2002 | Kim | 324/210 |
| 2003/0030934 | A1 | 2/2003 | Schaff | 360/66 |
| 2003/0038626 | A1 | 2/2003 | Carrington et al. | 324/210 |

FOREIGN PATENT DOCUMENTS

| JP | 2080975 | 3/1990 | G01R 31/00 |
|---|---|---|---|
| JP | 6309636 | 11/1994 | G11B 5/455 |
| JP | 92001006133 | 1/2001 | G11B 5/455 |
| JP | 92002025024 | 1/2002 | G11B 5/455 |

OTHER PUBLICATIONS

A. Wallash, "New Early Failure Phenomenon in Electrostatic Discharge Damaged Giant Magnetoresistive Recording Heads", Journal of Applied Physics, vol. 93, No. 10, May 15, 2003, pp. 7319-7321.

*Primary Examiner*—Bot Ledynh
*Assistant Examiner*—Reena Aurora
(74) *Attorney, Agent, or Firm*—Matthew S. Zises; Lewis L. Nunnelley

(57) ABSTRACT

A method is provided for testing a magnetoresistive sensor for polarity reversal. In one embodiment, the method includes: writing a test pattern on a magnetic disk; providing a mechanical or thermal stress to the magnetoresistive sensor for a period of time; and, comparing the polarity of the test pattern before and after the application of stress.

11 Claims, 7 Drawing Sheets

METHOD OF DETECTING POLARITY REVERSAL IN A MAGNETORESISTIVE SENSOR

BACKGROUND OF THE INVENTION

1. Field of the Invention

The invention relates to a method of testing a magnetoresistive sensor; and, more specifically, the invention relates to a method for testing a magnetoresistive sensor for susceptibility to a polarity reversal.

2. Description of the Background Art

Most of the data in contemporary computer systems are stored on disk drives using magnetic recording of digital information. A disk drive has at least one rotatable disk with discrete concentric tracks of data. Each disk drive also has at least one recording head typically having a separate write element and read element for writing and reading the data on the tracks.

A magnetoresistive sensor is used as the read element in most contemporary disk drives. A magnetoresistive sensor includes a sandwich of layers, also known as a sensor stack, including a ferromagnetic pinned layer, a nonmagnetic electrically conducting layer, and a ferromagnetic free layer. The resistance of the magnetoresistive sensor changes with respect to the direction and magnitude of an applied magnetic field such as the field from a written magnetic transition on a disk. To detect the change in resistance, sense current is passed through the sensor through electrical leads. Typically, hard bias material is disposed in layers near the ends of a sensor stack forming permanent magnets which impose a stabilizing magnetic biasing field on the sensor stack.

The sensor stack in some magnetoresistive sensors includes a relatively thick layer of antiferromagnetic material (AFM) such as an alloy of platinum manganese disposed adjacent to the pinned layer. The AFM layer helps to maintain the direction of magnetization in the pinned layer. Alternately, in a self-biased sensor, the AFM layer may be omitted. Instead, the pinned layer is formed such that the direction of magnetization in the pinned layer is held in place principally with stress induced magnetoanisotropy. These self-biased magnetoresistive sensors have the advantages of a smaller read gap and less sense current shunting through the AFM layer.

All sensors, and particularly self-biased sensors, are subject to a reversal of the direction of magnetization in the pinned layer. A magnetization reversal occurs when the direction of magnetization in the pinned layer is rotated approximately 180 degrees. A sensor which has experienced magnetization reversal in the pinned layer will exhibit a polarity reversal in the readback signal. Thus, the readback signal from a written transition which was originally positive will become negative if a polarity reversal in the pinned layer has occurred. Typically, the recorded information of the servo system is polarity sensitive. In some applications, the synchronization field recorded on the data track is also polarity sensitive. Accordingly, a disk drive having a magnetoresistive sensor which has undergone a magnetization reversal in the pinned layer will no longer function properly. A disk drive user may no longer be able to access the data stored on the disk drive.

Most conventional and self-biased magnetoresistive sensors have a low probability of a magnetization reversal. However some sensors are more susceptible, and the consequences of a magnetization reversal is severe. Accordingly, a method to detect if a sensor is susceptible to a magnetization reversal is greatly needed.

SUMMARY OF THE INVENTION

In a preferred embodiment, the invention provides a method for testing a magnetoresistive sensor for polarity reversal. A method thus provided may be used with any magnetoresistive sensor, and is particularly useful for self-pinned magnetoresistive sensors. The method includes writing a test pattern on a magnetic disk, creating a protrusion on the magnetic disk to perturb the magnetoresistive sensor, and reading the test pattern from the magnetic disk with the magnetoresistive sensor. The readback signal is then examined to detect a polarity reversal. A preferred method of creating a protrusion on the magnetic disk is to load a slider onto a disk having an aluminum substrate while the disk is rotating. Alternately a protrusion may be created by gouging the disk, depositing extraneous material onto the disk, or heating a small area with a laser. Many test patterns are suitable including a burst of an even number of transitions followed by a region which has no transitions.

Other aspects and advantages of the present invention will become apparent from the following detailed description, which, when taken in conjunction with the included drawings, illustrate by way of example the principles of the invention.

BRIEF DESCRIPTION OF THE DRAWINGS

FIG. 1b illustrates a view of the sensor stack wherein the direction of magnetization in the pinned layer is reversed compared to the magnetization illustrated in FIG. 1a;

DETAILED DESCRIPTION OF THE INVENTION

The invention is embodied in a method for testing magnetoresistive sensors for polarity reversals. A magnetoresistive sensor used in a storage device and which undergoes a polarity reversal will usually cause the storage device to malfunction. The method thus provided is effective, inexpensive, and provides assurance that magnetoresistive sensors susceptible to polarity reversals are identified and rejected.

Figure 1A:
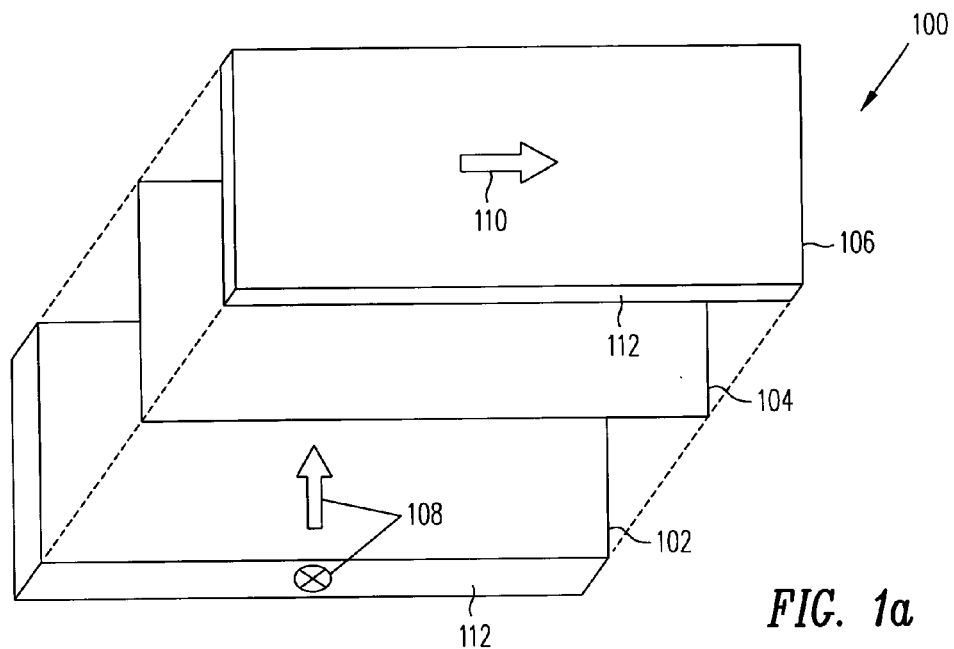
FIG. 1a illustrates a view (not to scale) of a magnetoresistive sensor stack.

FIG. 1a illustrates an exploded view (not necessarily to scale) of a portion of a magnetoresistive sensor 100. Typically, a magnetoresistive sensor 100 includes a sandwich or stack of layers including a ferromagnetic pinned layer 102, a nonmagnetic conductive layer 104, and a ferromagnetic free layer 106. The direction 108 of magnetization in the pinned layer 102 is ideally held in a fixed direction 108 and not allowed to rotate. This pinning action may be accomplished by exchange coupling with an adjacent antiferromagnetic layer (not shown). Alternatively, an antiferromagnetic layer may be omitted and the stress induced magnetoanisotropy of the pinned layer 102 may be relied on for pinning. If no antiferromagnetic layer is present, the sensor is said to be self-pinned. The pinned layer 102 may include an antiparallel coupled substructure of layers (not shown). In that embodiment, the direction 108 of magnetization in FIG. 1a represents the direction of magnetization in the layer adjacent to the nonmagnetic conductive layer 104. In the absence of an external magnetic field the direction 110 of magnetization in the free layer 106 is approximately orthogonal to the direction 108 of magnetization in the pinned layer 102. However, in the presence of an external magnetic field (not shown), the direction 110 of magnetization in the free layer 106 is free to rotate in response the external field. When the magnetoresistive sensor 100 is used in a disk drive for reading magnetically recorded information on a disk (not shown), one edge 112 of the sensor 100 is disposed toward the disk.

Figure 1B:
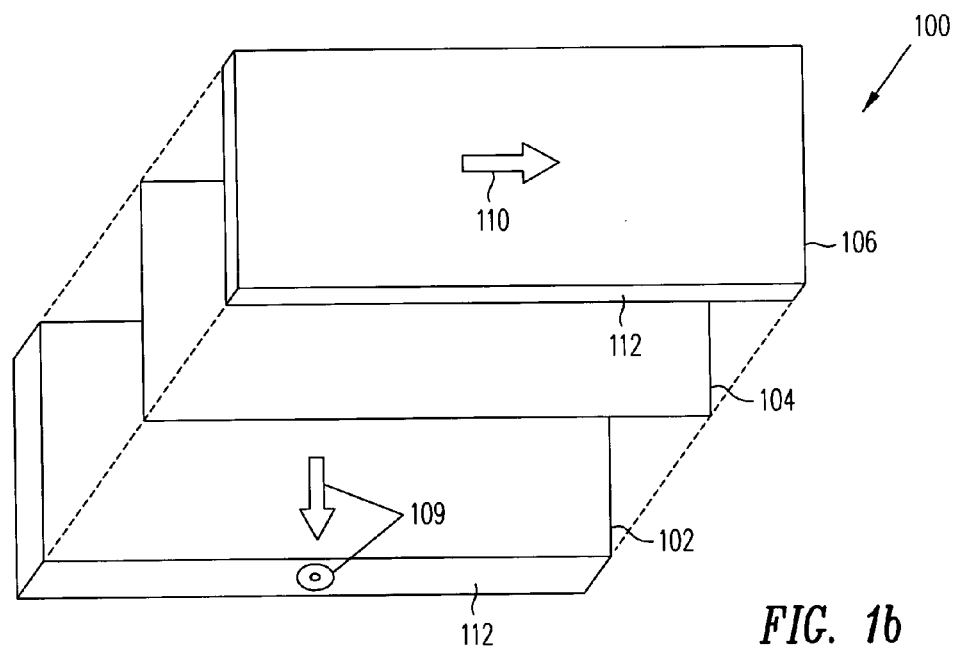

FIG. 1b illustrates an exploded view of a magnetoresistive sensor 100 wherein the direction 109 of magnetization in the pinned layer 102 has been reversed compared with the direction 108 of magnetization illustrated in FIG. 1a. The pinned layer 102 typically has a magnetic anisotropy such that the direction of magnetization is typically normal to the disk facing edge 112 and into (108 in FIG. 1a) the sensor 100, or normal to the disk facing edge 112 and out of (109 in FIG. 1b) the sensor 100. A sensor in which the direction of magnetization flips from one direction (108 in FIG. 1a) to the other direction (109 in FIG. 1b) is said to undergo a magnetization reversal in the pinned layer. The readback signal from the magnetoresistive sensor in which a magnetization reversal has occurred exhibits a polarity reversal. All magnetoresistive sensors are somewhat susceptible to magnetization reversal in the pinned layer. Self-pinned sensors appear to be somewhat more susceptible to magnetization reversal than magnetoresistive sensors using an antiferromagnetic layer. Reversal of the direction of magnetization in the pinned layer causes the observed polarity reversal of the readback signal.

Figure 2:
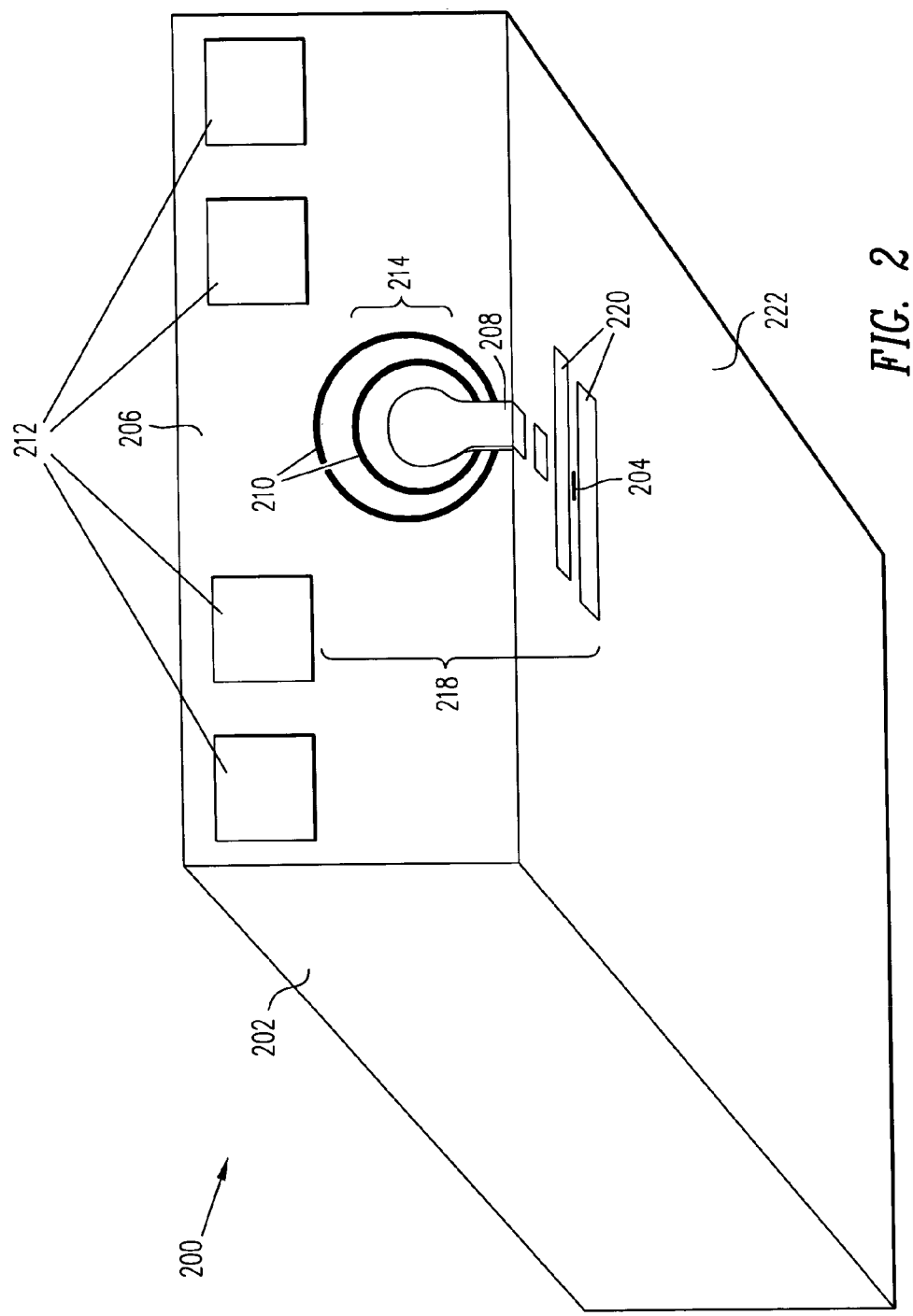
FIG. 2 illustrates a view of a slider with a recording head including a magnetoresistive sensor.

FIG. 2 illustrates a slider and a recording head assembly 200 configured for use in a storage device such as a disk drive. The recording head 218 is constructed on the trailing surface 206 of a slider 202. FIG. 2 illustrates the upper pole 208 and the turns 210 of the coil 214 of a write element of the recording head 218. The read element, including a magnetoresistive sensor 204 disposed between two magnetic shields 220, is formed between the slider body 202 and the write element. The electrical connection pads 212 which allow connection with the write element and read element are illustrated. The disk facing portion 222 of the slider 202 typically has an air bearing (not shown). The disk facing view of the recording head 218 is the view on the disk facing portion 222 of the slider 202.

Figure 3:
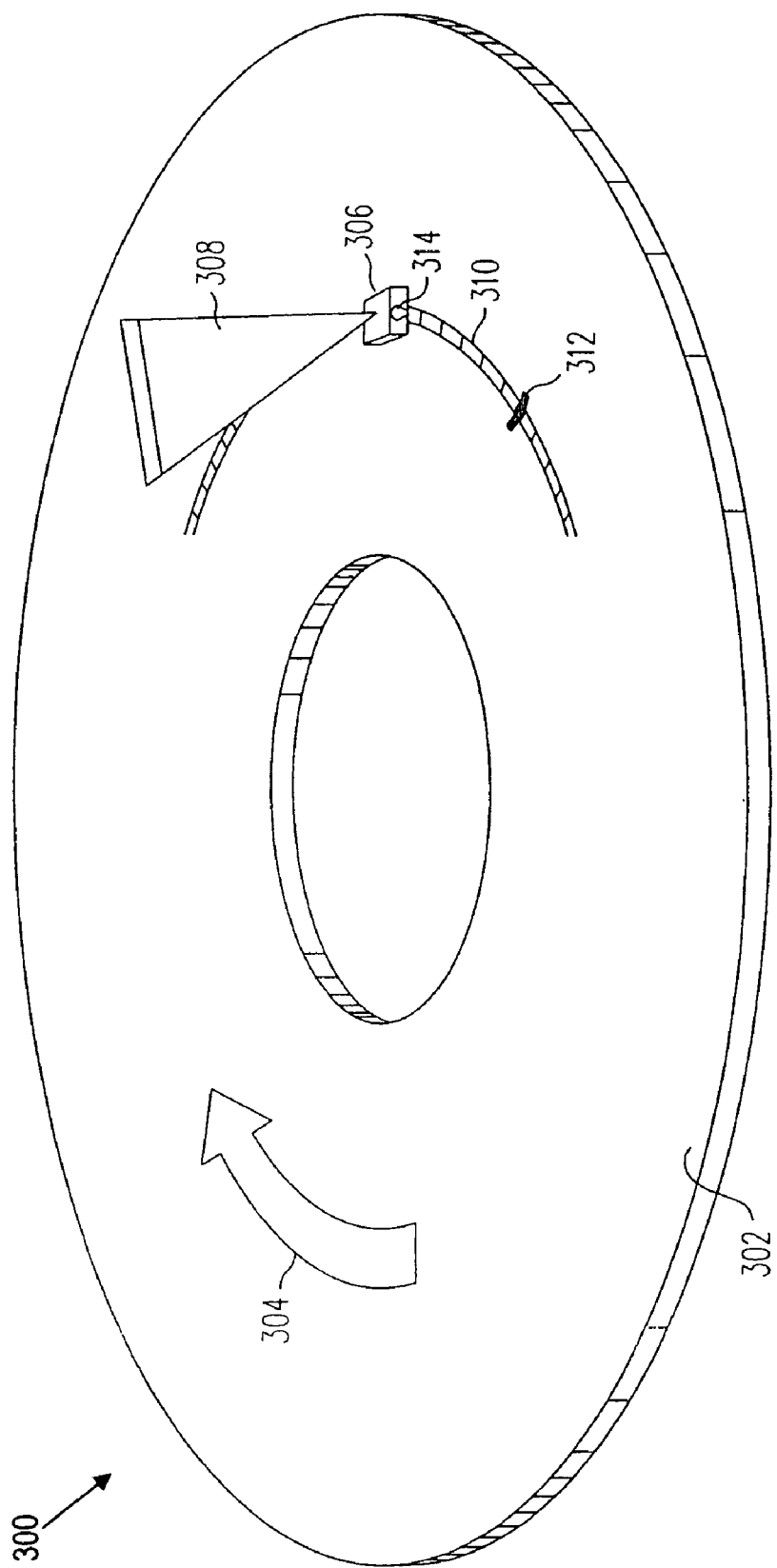
FIG. 3 illustrates a view of a exemplary apparatus used for polarity reversal testing.

FIG. 3 illustrates an apparatus 300 for testing magnetoresistive sensors for polarity reversals. A disk 302 used for magnetic recording is rotatably connected with a motor (not shown). The magnetic disk 302 rotates 304 while the magnetoresistive sensor is being tested. A slider 306, attached to a suspension 308, is disposed over the magnetic disk 302. A recording head 314 including a magnetoresistive sensor is disposed on the slider 306. A portion of a data track 310 is illustrated. The data track 310 contains a written pattern suitable for evaluating the magnetoresistive sensor for polarity reversal (discussed in detail below). At least one portion of the data track 310 also has a protrusion 312 capable of providing a perturbation to the magnetoresistive sensor.

Figure 4:
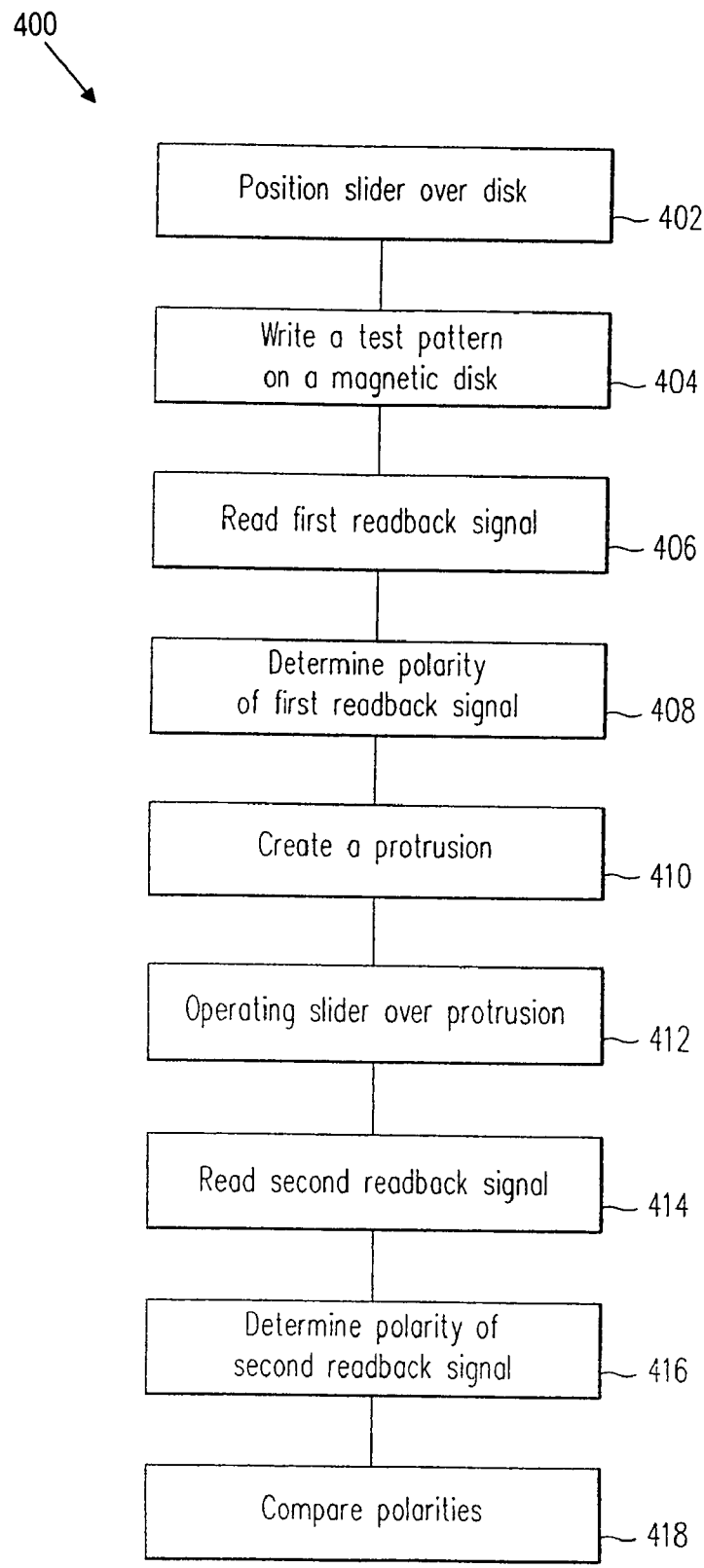
FIG. 4 illustrates one embodiment of a polarity reversal testing method.

FIG. 4 illustrates the preferred method 400 of testing a magnetoresistive sensor for susceptibility of polarity reversal. First, a slider with a recording head including a magnetoresistive sensor and a write element is positioned 402 over a rotating magnetic disk. Most sliders are designed to fly over the disk, however sliders designed to be in partial or full contact with the disk are also suitable. A test pattern is then recorded 404 on the disk using the write element of the recording head. For convenience, a plurality of tracks may be written. The magnetoresistive sensor is then used to perform a first readback 406 of the test pattern and the polarity of the first readback signal is determined 408. At least one protrusion is created on the disk 410. In one embodiment, a protrusion is created by loading and unloading the slider on the rotating disk. This embodiment is especially suitable when the disk has a relatively soft substrate such as aluminum or aluminum alloy. The slider is operated over the rotating disk at the radius of the protrusion for a preset period of time 412. This period of time is not critical; typically one minute is sufficient. The slider is allowed to strike the protrusion during this period of time. The test pattern is then read 414 again with the magnetoresistive sensor and the polarity of this second readback signal is determined 416. The polarity of the first readback signal is then compared with the polarity of the second readback signal to determine if a change in polarity has occurred 418. If no change in polarity has occurred, the magnetoresistive sensor is judged to be healthy. If a change in polarity has occurred, the head is demonstrably susceptible to a signal polarity reversal and is considered defective.

Figure 5:
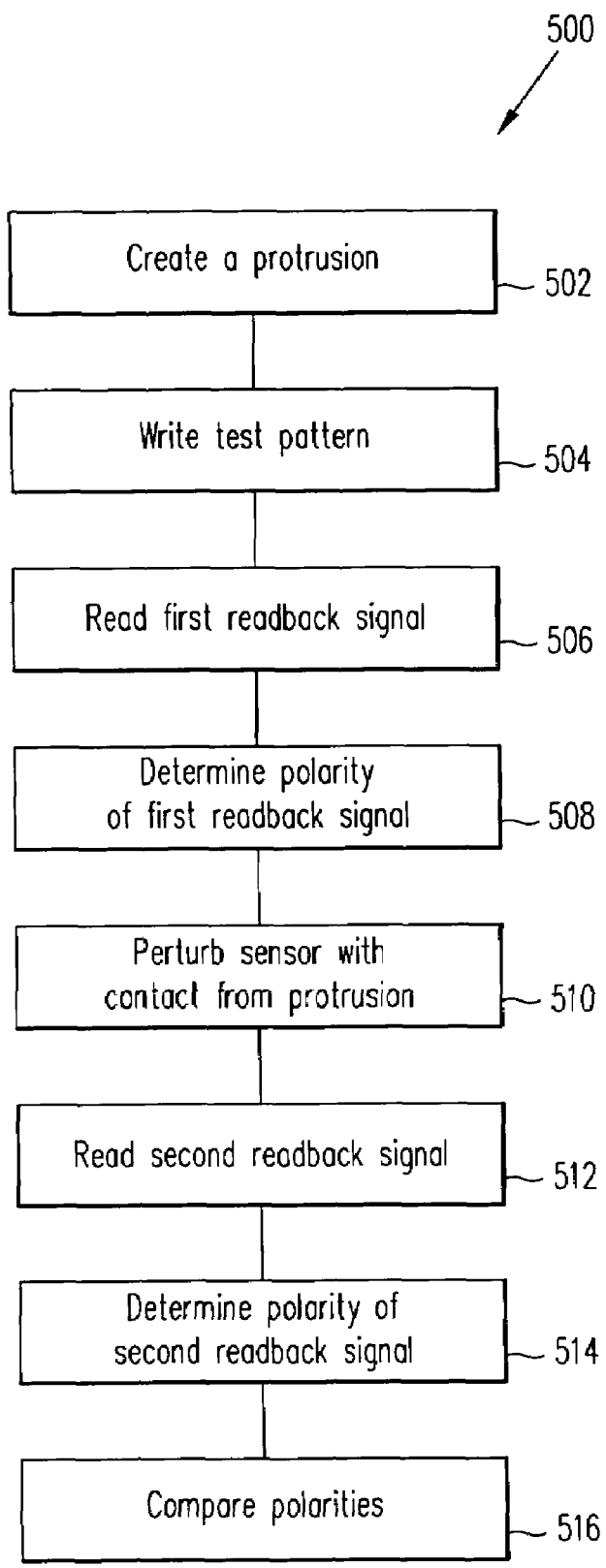
FIG. 5 illustrates an alternate embodiment of a polarity reversal testing method.

FIG. 5 illustrates an alternative method of testing magnetoresistive sensors for susceptibility to a magnetization reversal of the pinned layer. One or more protrusions are first created on a disk 502. The protrusion may be created by depositing a suitable material such as chromium onto the disk. A protrusion may also be created by other means such as localized heating with a laser. These methods are suitable for a disk having a relatively hard substrate such as glass. A slider with a recording head is positioned over the rotating disk and a suitable test pattern is written on the disk with the write element of the recording head 504. The magnetoresistive sensor is used to read the test pattern 506 and the polarity of this first readback signal is determined 508. The slider is operated over the rotating disk at the radius of the protrusion for a preset period of time 510 in order to perturb the sensor. The magnetoresistive sensor is again used to read 512 the test pattern and the polarity of the second readback signal is determined 514. The polarity of the first readback signal is then compared with the second readback signal to determine if a change in polarity has occurred 516.

Figure 6A:
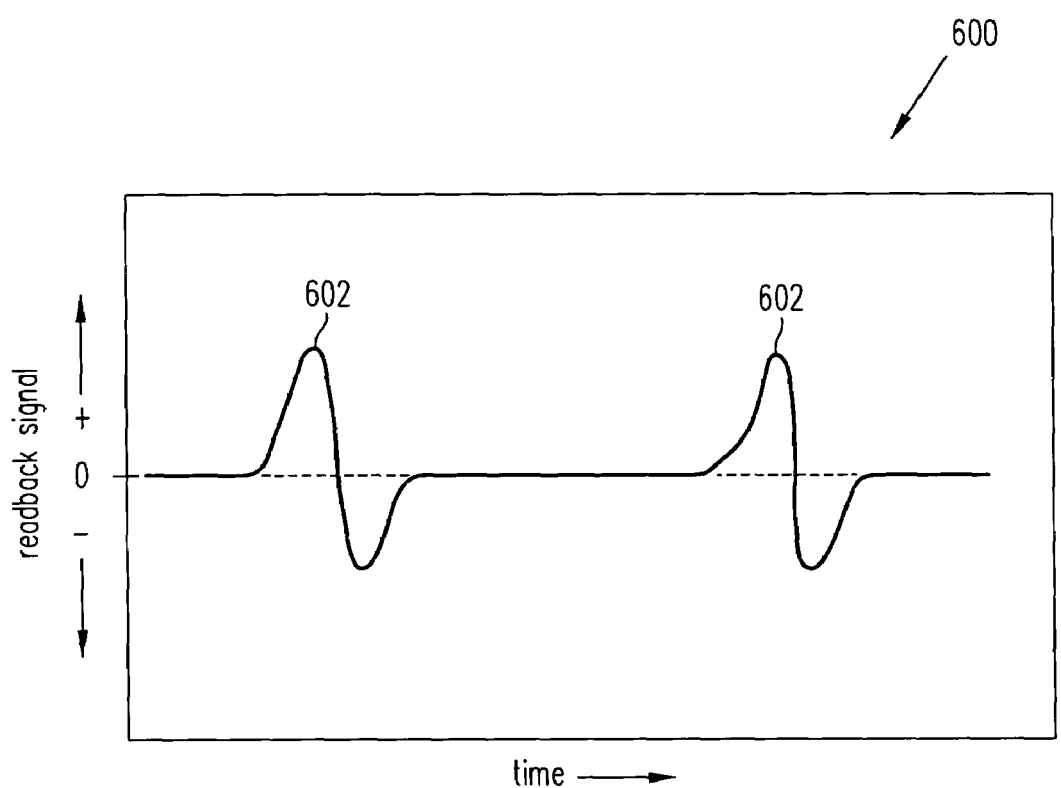
FIG. 6a illustrates a readback signal from a magnetoresistive sensor before a polarity reversal.
Figure 6B:
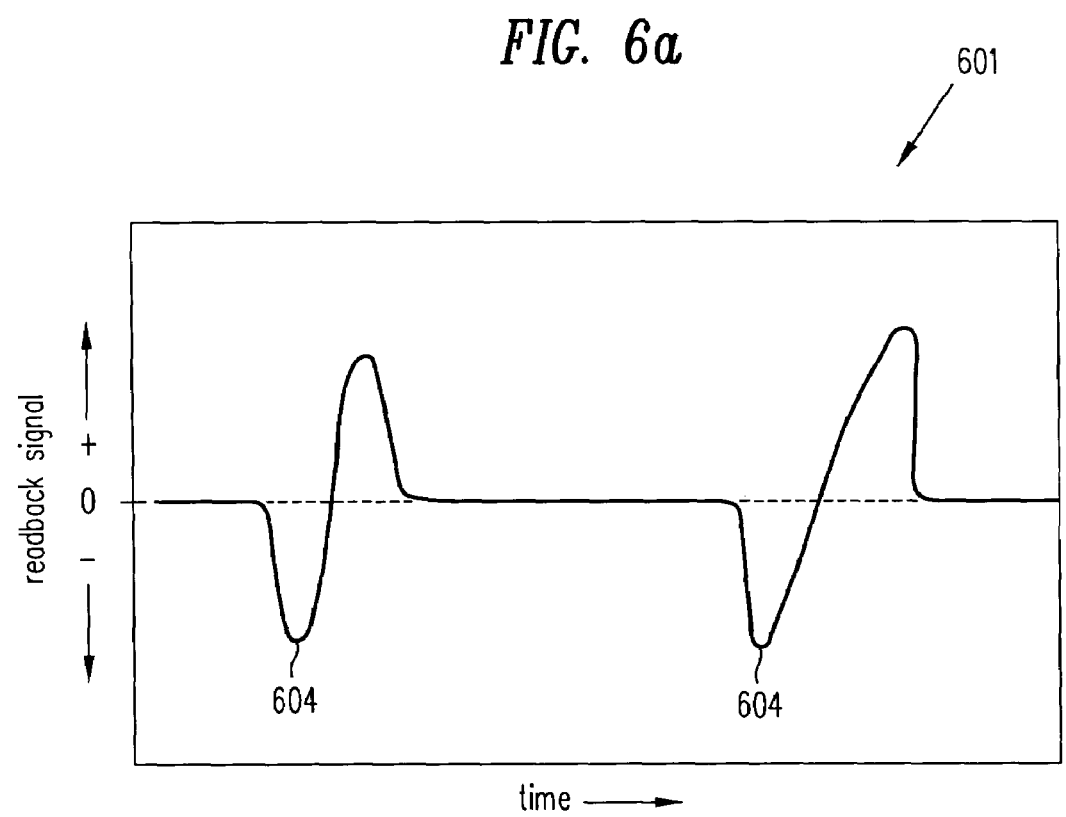
FIG. 6b illustrates a readback signal from a magnetoresistive sensor after a polarity reversal.

A suitable test pattern for testing has appropriate asymmetry to facilitate the identification of a polarity reversal in the readback signal. For example, a simple repeating dibit pattern as illustrated schematically in FIGS. 6a and 6b is suitable. In FIG. 6a the schematic readback signal 600 of a recorded pattern of repeating dibits is illustrated. The first readback pulse 602 of each dibit is positive. If the magnetoresistive sensor undergoes a magnetization reversal in the pinned layer, then the readback signal 601 appears as illustrated in FIG. 6b. In this latter readback signal 601, the first pulse 604 of each dibit is negative. The polarity of the readback signal may be determined by visual observation of the readback signal, or easily implemented as a simple software task.

Figure 7A:
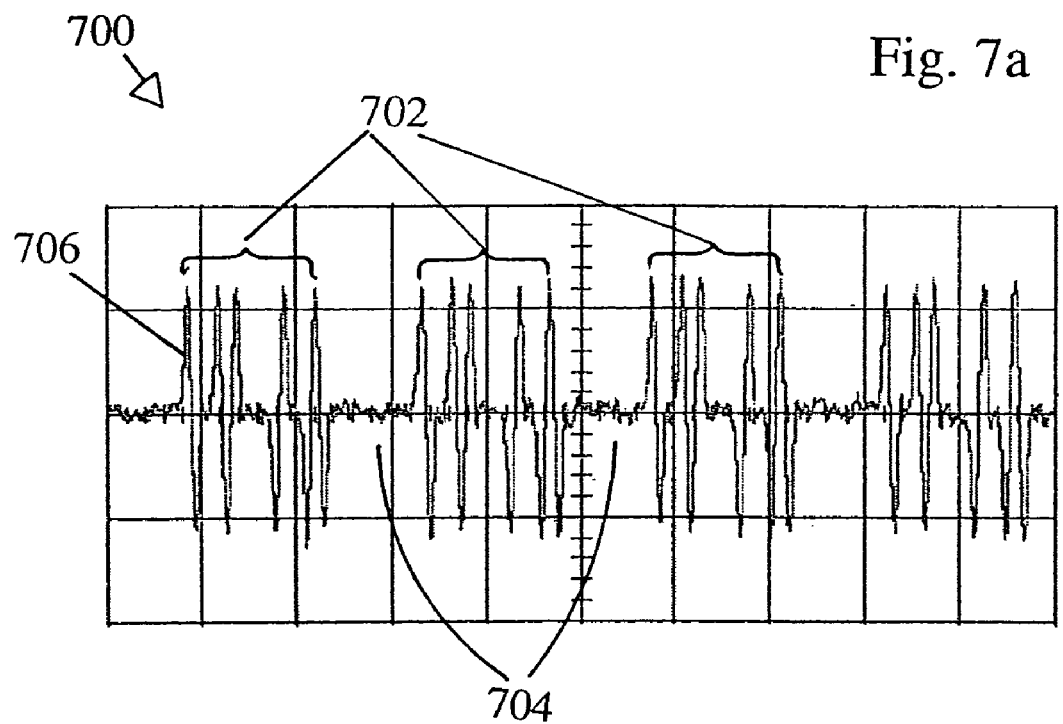
FIG. 7a illustrates a readback signal from a magnetoresistive sensor before a polarity reversal; and, FIG. 7b illustrates a readback signal from the magnetoresistive sensor after a polarity reversal.
Figure 7B:
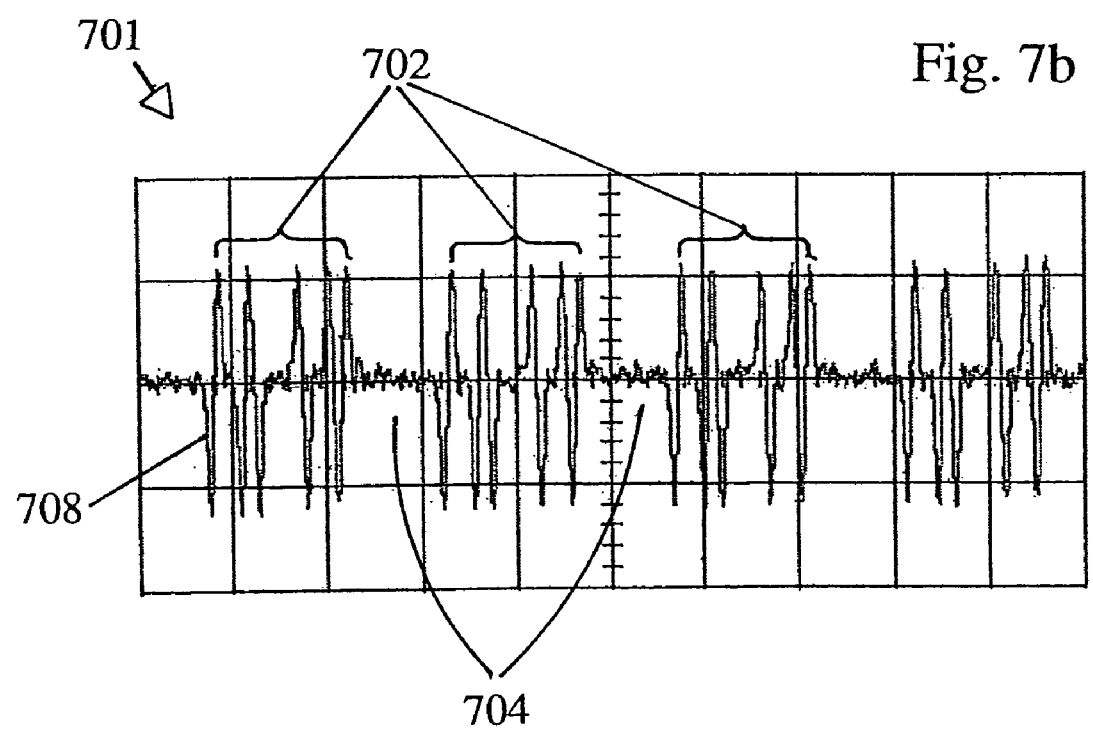

FIGS. 7a and 7b illustrate two read back signals. A self-biased magnetoresistive sensor was used to collect the readback signals in FIGS. 7a and 7b. FIG. 7a illustrates a readback signal 700 at the beginning of a test. FIG. 7b illustrates a readback signal 701 from the same magnetoresistive sensor after repeatedly striking a protrusion for one minute. The test pattern used in this particular test was more complex than the simple repeating dibit pattern previously illustrated schematically in FIGS. 6a and 6b. However, the test pattern in FIGS. 7a and 7b has a repeating sequence that facilitates the identification of a polarity reversal. Typically, a suitable test pattern includes a group 702 of transitions, resulting in an equal number of readback pulses, followed by a region 704 with no transitions. The overall sequence of a group of transitions followed by a region with no transitions is then repeated around the track. The polarity 708 of the readback signal 701 from FIG. 7b is reversed compared with the polarity 706 of the readback signal 700 from FIG. 7a indicating that this particular magnetoresistive sensor is susceptible to reversal.

The testing method described in detail above depends on providing a perturbation or stimulus to the magnetoresistive sensor to accelerate the rotation of the magnetization from one direction to the other in the pinned layer. This stimulus is preferably provided by repeatedly striking the magnetoresistive sensor with a protrusion extending from the disk. The specific mechanism is likely providing mechanical stress to the sensor, although heating effects might also play a role. During testing, contact may occur between the protrusion and the sensor, or between the protrusion and the slider near the sensor. When using sliders that normally fly over a disk, testing for polarity reversal may be accelerated by reducing the flying height thereby causing more contact. A suitable method of reducing flying height is to reduce the atmospheric pressure during the test. When using sliders designed for contact, similar acceleration may be obtained by increasing the force of the slider against the disk.

Although specific embodiments of the invention have been described and illustrated, one skilled in the art will recognize other embodiments, not expressly described, but which fall within the scope of the invention.

We claim:

1. A method for testing a magnetoresistive sensor for polarity reversal, comprising:
    writing a test pattern on a magnetic disk;
    using a magnetoresistive sensor on a slider to read a first readback signal from the test pattern;
    determining the polarity of the first readback signal;
    creating a protrusion on the magnetic disk;
    operating the slider over the protrusion for a preset period of time;
    using the magnetoresistive sensor to read a second readback signal from the test pattern;
    determining the polarity of the second readback signal; and,
    comparing the polarity of the first readback signal to the polarity of the second readback signal to determine if a change in polarity has occurred.

2. A method as in claim 1 wherein the protrusion is created by loading the slider on the magnetic disk while the magnetic disk is rotating.

3. A method as in claim 1 wherein the protrusion is created by gouging the magnetic disk.

4. A method as in claim 1 wherein the protrusion is created by locally heating the magnetic disk with a laser.

5. A method as in claim 1 wherein the test pattern on the disk includes a group of written transitions followed by a space with no transitions.

6. A method for testing a magnetoresistive sensor on a slider for polarity reversal, comprising:
    creating a protrusion on the magnetic disk;
    writing an asymmetrical pattern on a magnetic disk;
    using the magnetoresistive sensor to read a first readback signal from the test pattern;
    determining the polarity of the first readback signal;
    providing a perturbation to the magnetoresistive sensor with the protrusion;
    using the magnetoresistive sensor to read a second readback signal from the test pattern;
    determining the polarity of the second readback signal; and,
    comparing the polarity of the first readback signal to the polarity of the second readback signal to determine if a change in polarity has occurred.

7. A method as in claim 6 wherein the protrusion is created by loading the slider onto the magnetic disk while the magnetic disk is rotating.

8. A method as in claim 6 wherein the protrusion is created by sputtering material onto the magnetic disk.

9. A method as in claim 6 wherein the protrusion is created by gouging the magnetic disk.

10. A method as in claim 6 wherein the test pattern includes a group of written transitions followed by a space with no transitions.

11. A method as in claim 6 wherein the protrusion is created by locally heating the magnetic disk with a laser.

\* \* \* \* \*